Oct. 6, 1953     R. MOCKLI     2,654,616
COMBINED AUTOMOBILE TRAY AND
PASSENGER SAFETY GUARD
Filed Nov. 5, 1949
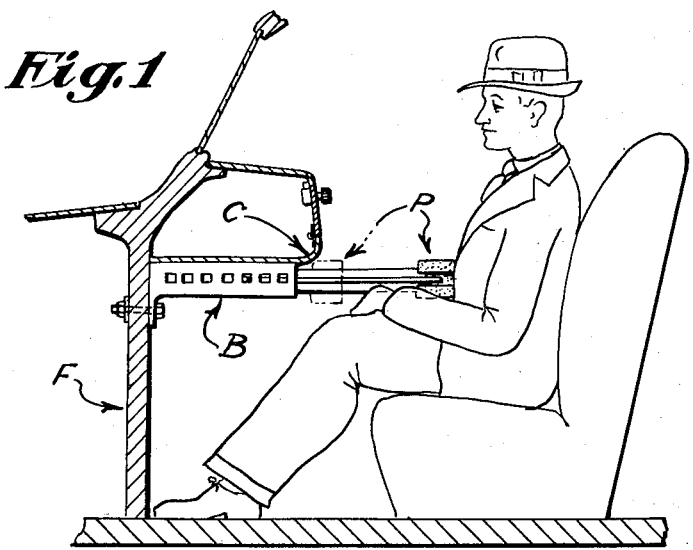
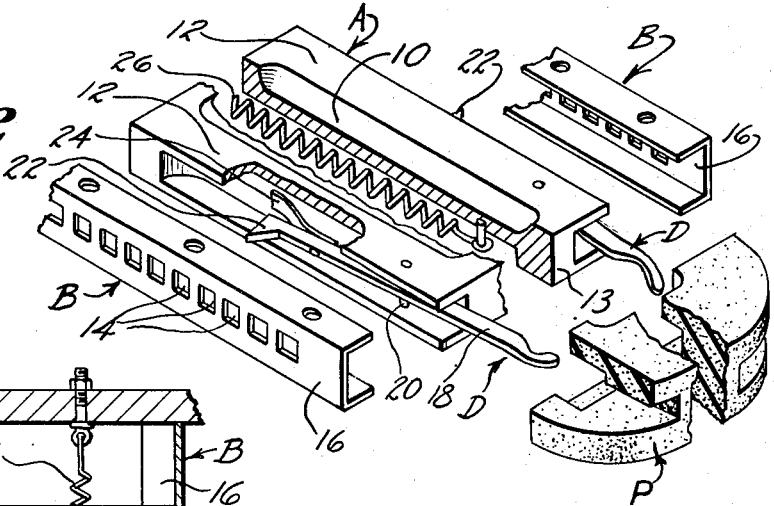
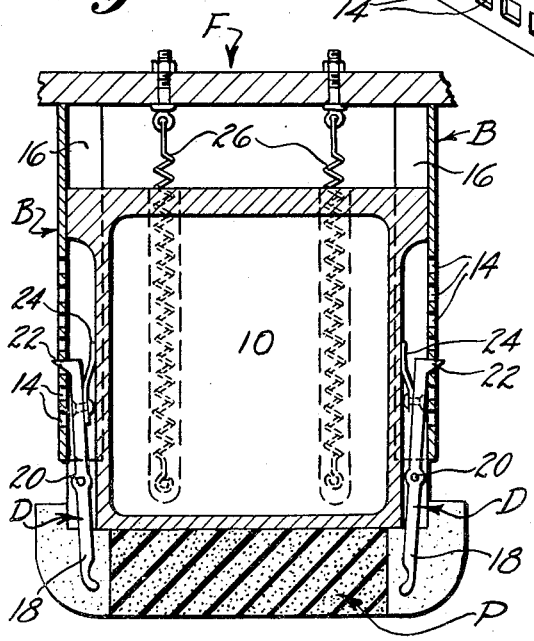
INVENTOR.
Rene Mockli
BY Harry Langsam
Attorney Patented Oct. 6, 1953

2,654,616

UNITED STATES PATENT OFFICE 2,654,616

COMBINED AUTOMOBILE TRAY AND PASSENGER SAFETY GUARD

Rene Mockli, Upper Darby, Pa.

Application November 5, 1949, Serial No. 125,698

4 Claims. (Cl. 280—150)

My invention relates to trays, and refers specifically to a retractable tray for use in an automobile; the tray also serving as a guard or protective support in the event of a collision.

It is often desirable to have a tray or table structure in an automobile, for example while eating, studying maps, or while writing. In addition, it is desirable to provide an auxiliary front support for the occupants of the front seat next to the driver, so that in the event of a collision, the occupants will not be thrown against the dashboard and windshield. This support provides the same sort of protection that the steering wheel affords the driver, even better, since the tray is padded.

Therefore, an object of my invention is to provide a tray for an automobile, together with means for concealing the tray when not in use.

Another object of my invention is to provide a tray of the above description which will also serve as a collision guard.

Other objects of my invention are to provide an improved device of the character described, that is easily and economically produced, which is sturdy in construction, and which is highly efficient in operation.

With the above and related objects in view, my invention consists in the details of construction and combination of parts as will be more fully understood from the following description, when read in conjunction with the accompanying drawings in which:

Fig. 1 is a fragmentary sectional elevation view showing the tray attached to the underside of the glove compartment.

Fig. 2 is a fragmentary exploded view of the tray and its supporting elements.

Fig. 3 is a partly sectional top view of the tray and its support.

Referring now to the drawing, wherein similar reference characters designate similar parts, I show an automobile serving tray adapted to fit under the glove compartment of an automobile the tray being generally designated as A. The tray A consists of a unitary sheet 10 preferably made of laminated plastic, hard rubber, plywood, metal, or any other suitable material. The sheet is substantially rectangular, and has marginal side rims 12. The front edge 13 of the tray is covered with a buffer pad P of sponge rubber or other padding material, and this pad also serves as a handle by which the tray may be drawn out for use. The tray slides in a pair of horizontal channel rails, each designated generally as B. The rails are attached to the underside of the glove compartment C and also the engine fire wall F.

Each rail has a plurality of rectangular apertures 14 in its web portion 16, which serve to lock the tray at any desired amount of extension.

A pair of handle locks, each designated generally as D are mounted within the marginal rims 12 adjacent each side edge thereof. Each handle lock D comprises a handle member 18 attached to the tray by a pivot 20. The rear end of the handle terminates in a bevelled latch 22 which normally projects laterally under the influence of a leaf spring 24. The tray is normally held retracted by a pair of tension springs on each side; the springs being each designated as 26.

When the tray is fully extended, the operator releases it, whereupon the handle latches seat themselves within the adjacent apertures 14, thereby holding the tray extended.

To conceal the tray, the user moves the handle locks D outwardly, whereby the latches are withdrawn from the apertures, permitting the tension springs to retract the tray.

In the fully extended position, the padded front edge P of the tray furnishes support to the occupant of the seat, so that in the event of a sudden stop or collision, the tray prevents the occupant from being thrown against the dash or the windshield.

Although my invention has been described in considerable detail, such description is intended as being illustrative rather than limiting, since the invention may be variously embodied, and the scope of the invention is to be determined as claimed.

I claim as my invention:

1. A combined automobile tray and collision guard comprising a tray, a pair of rails upon which said tray is movable, a plurality of aligned recesses in each of said rails, a pivoted spring pressed lever attached to said tray, one end of said lever having a hook thereon which is adapted to engage within one of said recesses whereby the tray will be held in a predetermined position, and a padding distributed on the front and side edges of said tray, and a plurality of springs, one end of each spring being attached to said tray and the other end of each spring being attached to a portion of an automobile whereby the spring will normally pull the tray to a closed position.

2. A combined automobile tray and collision guard comprising a substantially rectangular body member having a recess in one face thereof, a pair of latch members pivoted to said body, the axis of the pivots of said latch members being perpendicular to the said face having the recess therein, one of said latch members being mounted adjacent one edge of said body member and the other of said latch members being mounted adjacent the opposite edge thereof, a pair of guide members connected to the automobile body, one of said guide members being provided adjacent the said one edge of said body member and the other of said guide members being provided adjacent the said opposite edge thereof, each of said guide members having a plurality of latch retaining means whereby said pivoted latch members are adapted to selectively coact with each of said retaining means for the purpose of securing said body member in a predetermined position, spring means connected to said body member and to said automobile body and adapted to bias said body member into a predetermined position, and a resilient guard means on a third edge of said body member, said guard means being adapted to cushion a rider in the automobile during an impact.

3. The device of claim 2 wherein each of said guide members comprises a pair of parallel walls which are connected by a third wall perpendicular to said parallel walls to form a channel, and wherein a plurality of spaced openings are formed in said third wall, said openings forming the said latch retaining means.

4. The device of claim 2 wherein each of said latch members are spring biased toward said guide members, and wherein a lever is connected to each of said latch members, said levers being adapted to be manually actuated.

RENE MOCKLI.

References Cited in the file of this patent

UNITED STATES PATENTS

| Number | Name | Date |
|---|---|---|
| 686,249 | Beery | Nov. 12, 1901 |
| 1,548,870 | Crafton | Aug. 11, 1925 |
| 1,619,697 | Brown | Mar. 1, 1927 |
| 2,322,755 | Voorhies | June 29, 1943 |
| 2,498,243 | Brinker | Feb. 21, 1950 |